US007756482B2

(12) United States Patent
Lin et al.

(10) Patent No.: US 7,756,482 B2
(45) Date of Patent: *Jul. 13, 2010

(54) SCHEDULING METHOD FOR WIRELESS MULTIHOP RELAY COMMUNICATION SYSTEMS AND SYSTEM THEREOF

(75) Inventors: Shiang-Jiun Lin, Nantou (TW); I-Kang Fu, Kaohsiung (TW); Cheng-Kang Pai, Taipei (TW); Wen-Ho Sheen, Chiayi (TW)

(73) Assignee: Acer Inc., Taipei Hsien (TW)

( * ) Notice: Subject to any disclaimer, the term of this patent is extended or adjusted under 35 U.S.C. 154(b) by 796 days.

This patent is subject to a terminal disclaimer.

(21) Appl. No.: 11/614,982

(22) Filed: Dec. 22, 2006

(65) Prior Publication Data
US 2008/0108305 A1    May 8, 2008

(30) Foreign Application Priority Data
Oct. 13, 2006  (TW)  .............................. 95137676 A

(51) Int. Cl.
*H04B 17/00* (2006.01)
(52) U.S. Cl. ..................... 455/67.13; 455/7; 455/9; 455/67.11; 370/315
(58) Field of Classification Search ............... 455/7–10, 455/14–25, 67.11, 67.13; 370/315
See application file for complete search history.

(56) References Cited
U.S. PATENT DOCUMENTS
2006/0046643 A1   3/2006  Izumikawa et al.
2008/0274746 A1*  11/2008  Lin et al. .................... 455/449

2009/0003260 A1*  1/2009  Guo et al. .................... 370/315

FOREIGN PATENT DOCUMENTS
WO    WO 03/058984 A2    7/2003

OTHER PUBLICATIONS
European Search Report dated Oct. 2, 2008, in related European Application No. 06127342.1.
Norbert Esseling, Bernhard H. Walke, Ralf Pabst, "Performance of MAC-Frame-Based Protocols for Mobile Broadband Systems using Layer 2 Relays", Communication Networks, Aachen, Germany, 11th Wireless World Research Forum, Jun. 10-11, 2004, Oslo, Norway.
Daniel C. Schultz, Bernhard Walke, Ralf Pabst, Tim Irnich, "Fixed and Planned Relay Based Radio Network Deployment Concepts", Aachen University, Chair of Communication Networks (ComNets), Germany, 10th Wireless World Research Forum, Oct. 27-28, 2003, New York, USA.

* cited by examiner

*Primary Examiner*—Raymond S Dean
(74) *Attorney, Agent, or Firm*—Jianq Chyun IP Office

(57) ABSTRACT

A scheduling technique for wireless multihop relay communication systems is provided. With spatial separation caused by the shadowing effect of surrounding buildings, a base station and its relay stations in a single cell are divided into several groups by following the rule that stations with severe potential interference are separated into different groups. The base station arranges the scheduling of these groups and serves these groups sequentially in the time domain. To take advantage of shadow effect, the same radio resources can be scheduled for relay stations within the same group due to the isolation of interfering signals. In the present invention, base stations and relay stations are equipped with directional antennas or sector antennas to further exploit the advantage of spatial separations. Different relay groups can also reuse the radio resource through appropriate power control. The cell capacity can be enhanced substantially because of aggressive radio resource reuse.

58 Claims, 10 Drawing Sheets

SCHEDULING METHOD FOR WIRELESS MULTIHOP RELAY COMMUNICATION SYSTEMS AND SYSTEM THEREOF

CROSS-REFERENCE TO RELATED APPLICATION

This application claims the priority benefit of Taiwan application serial no. 95137676, filed Oct. 13, 2006. All disclosure of the Taiwan application is incorporated herein by reference.

BACKGROUND OF THE INVENTION

1. Field of the Invention

The present invention relates to a method for grouping relay stations in a wireless multi-hop relay communication system and a system thereof. More particularly, the present invention relates to a scheduling method for a wireless multi-hop relay communication system for improving the transmission efficiency and capacity of the system.

2. Description of Related Art

Next generation mobile communication systems are envisioned to provide high-speed, high link quality, and high security transmissions, and are also expected to support various communication services. An effective resource schedule/allocation method has to be established to meet different quality of service (QoS) requirements from different users. Users located at cell boundary have worse link quality due to the long transmission distance to the base station, and users in the cell with severe shadowing effect also have worse link quality, thereby the foregoing users cannot perform high-speed data transmissions. To resolve the foregoing problem, the deployment density of base stations can be increased to shorten the propagation distances between the base stations and users so as to improve the link quality; or more base stations can be deployed at those areas with severe shadowing for improving the link quality of users in the areas. However, the cost of the base stations and the cost of the backhaul network connections will be substantially increased by the aforementioned method. On the other hand, the transmission power of the base station can be increased to improve the link quality and to reduce the cost of the base station. However, if the transmission power is increased, not only the transmission cost will be increased but also the interference level will be increased.

Multi-hop relay cell architecture is a good solution when considering all factors such as QoS, deployment cost, transmission power, and coverage area of the cell. Relay stations can be deployed within a cell to relay information from a base station to mobile stations with worse link quality, and vise versa. It has been shown that using relay stations may improve cell coverage, user throughput and system capacity.

Relay stations may be deployed at areas with severe shadowing or near the cell boundary, the users who can not be directly served by base station may be served by the relay stations, therefore the effective coverage area of the base station can be extended.

A single link with worse quality is divided into a plurality of links with better quality so that each of the links can provide higher transmission rate. However, since the same data will be duplicated and relayed over the air multiple times for multi-hop transmissions, it consumes the radio resources.

Besides, since there are a base station and several relay stations in a cell, to improve the spectrum efficiency, multiple serving stations may be active simultaneously if the potential interference is tolerant.

To obtain benefits for multi-hop relay communication systems, an efficient scheduling mechanism is required to arrange the transmissions of base stations and relay stations.

To improve the performance of a wireless communication system, a method of relay stations deployment in a Manhattan-like environment was provided in the Wireless World Initiative New Radio (WINNER) program. The Manhattan-like environment is a grid environment wherein the width of blocks is about 200 m and the width of streets is about 30 m.

FIG. 2 illustrates a first layout of relay stations in a Manhattan-like environment, wherein a base station 205 and four relay stations 201~204 are disposed, and the base station and the relay stations all communicate with users through omni-directional antennas. However, since the relay stations are disposed outside of the coverage area 206 of the base station, each relay station requires an additional directional antenna pointing at the base station for communicating with the base station, and which increases the hardware cost of the relay stations.

FIG. 3 illustrates the transmission scheduling in such structure, wherein frame structures are transmitted within a single cell. The frame S301 may be divided into two sub-frames S302~S303. The first sub-frame S302 is further divided into 5 time slots S304~S308, wherein the base station 305 serves the 4 relay stations 301~304 during the first 4 time slots S304~S307 respectively and the base station 305 serves users within area 306 which is directly connected to the base station during the fifth time slot S308. The second sub frame S303 is divided into two time slots S309~S310, and with the characteristics of spatial separation of the environment, the relay stations 301 and 302 serve users within the areas 307 and 308 connected thereto during the same time slot S309, and the relay stations 303 and 304 serve users within the areas 309 and 310 connected thereto during another time slot S310.

FIG. 4 illustrates the layout of relay stations in a multi-cell structure, wherein the coverage area 406 of a single cell A and the coverage area 416 of a single cell B are arranged in a staggered way. The base stations 405 and 415 in FIG. 4 respectively represent the positions of the base stations in cell A and cell B. The relay stations 401, 402, 403, and 404 belong to cell A, and the relay stations 411, 412, 413, and 414 belong to cell B. The arrangement of transmission frames thereof is shown in FIG. 5, wherein the arrangement of transmission frames between adjacent cells is to permute the operation orders of the sub-frames S502~S503 in a frame S501 so that interference between cells can be prevented. The main purpose of the relay stations is to extend the coverage area of the base station, however, the link quality of users at the boundary of the service range of the base station cannot be improved. Besides, all the base station are idled for some time durations in the frame structure, since base stations are the only serving stations connected to the backhaul networks and carrying the effective data, the transmission efficiency of the base station in this design is not ideal.

FIG. 6 illustrates the second layout of a base station 605 and four relay stations 601~604 in a Manhattan-like environment, wherein the base station and the relay stations all communicate with users by using omni-directional antennas. Since the relay stations 601~604 are disposed within the coverage area 606 of the base station, no additional directional antenna is required by each relay station for communicating with the base station and in the design, the link quality of users in the cell boundary can be improved.

In this layout with all serving stations equipped with omni-directional antennas, the feasible transmission scheduling is shown as FIG. 7. FIG. 7 illustrates the transmission frame structure in a single cell, wherein the base station 705 respectively serves the four relay stations 701~704 sequentially during the first four time slots S701~S704, and at the same time, the base station 705 serves users directly connected to the base station 705. The relay stations 701 and 703 serve users connected thereto during the time slot S705. After that, the relay stations 702 and 704 serve users during the next time slot S706. The main purpose of such a layout is to improve the link quality of users at cell boundary; however, a complete transmission within a single cell requires at least 6 phases to be completed. When considering the multi-cell structure, because of the use of omni-directional antennas, the reuse factor of at least 2 is required to avoid the severe inter-cell interference, and thus decreases the overall system capacity.

Regardless of the first layout or the second layout that all serving stations are equipped with omni-directional antennas, all the base station and the relay stations are idled for some time in the frame structure, thus, the transmission efficiency thereof is not ideal.

SUMMARY OF THE INVENTION

Accordingly, the present invention is directed to a transmission scheduling method for a wireless multi-hop relay communication system, wherein relay stations are disposed within the coverage area of a base station for serving users with poor link quality to the base station. In the present invention, base stations and relay stations are equipped with directional antennas or sector antennas to further exploit the advantage of spatial separations inherited in the environment, and through the mechanism of grouping and permutation of transmission scheduling, interference inside a single cell and between adjacent cells is reduced, accordingly, the capacity of the system is improved.

The present invention provides a transmission scheduling method for a wireless multi-hop relay communication system. The wireless communication system includes at least one base station and at least one relay station. The transmission scheduling method includes following steps. Each of the relay stations measures the intensity of potential interference level from other relay stations and reports the measurement result to the base station. The base station separates the relay stations into N groups according to the potential interference levels, wherein N is an integer greater than 0 and the smaller the value of N is, the better. The relay stations are separated based on such a rule that those relay stations having potential interference level within a tolerable intensity range are put into the same group, and the relay stations in the same group can transmit data by reusing the same radio resources. If the relay stations are separated into N groups, N phases are considered a service period in the transmission scheduling mechanism. The base station determines the service order of the groups. The base station serves the relay stations in the $j^{th}$ group during the $i^{th}$ phase of a service period, wherein $1 \leq i, j \leq N$. Relay stations not in the $j^{th}$ group serve users within the coverage areas with appropriate power control thereof during the $i^{th}$ phase of the service period.

The transmission scheduling mechanism in the present invention is described as follows with time division duplex access as example. When a base station serves the relay stations of a particular group with directional antennas or sector antennas, the relay stations of other groups which are not served by the base station during this period serve users within their coverage areas by appropriate power control. According to the transmission scheduling mechanism, users of different groups can have time division multiple accesses with divisions in the time domain, while the relay stations within the same group can reuse the radio resources at the same time and on the same frequency through the characteristic of spatial separation, so that the transmission efficiency and the capacity of the system can be improved.

In a multi-cell structure, transmission scheduling between adjacent cells can be achieved by permuting group service order of the transmission scheduling of single cells. As to any two adjacent cells A and B, when the base station in cell A serves a particular group j in cell A during the $i^{th}$ phase, the base station in the adjacent cell B serves another group k in cell B which has less interference to group j in cell A during the $i^{th}$ phase, thus, high spectrum efficiency and high transmission efficiency of the system can be achieved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The following embodiments will be described with a Manhattan-like environment as an example, and those having ordinary knowledge in the art should be able to implement the present invention in any other environment according to the spirit of the present invention and the descriptions of the following embodiments. In following embodiments, interference level is weakened by spatial separation produced by the shadowing effect of surrounding buildings in a Manhattan-like environment.

Figure 8:
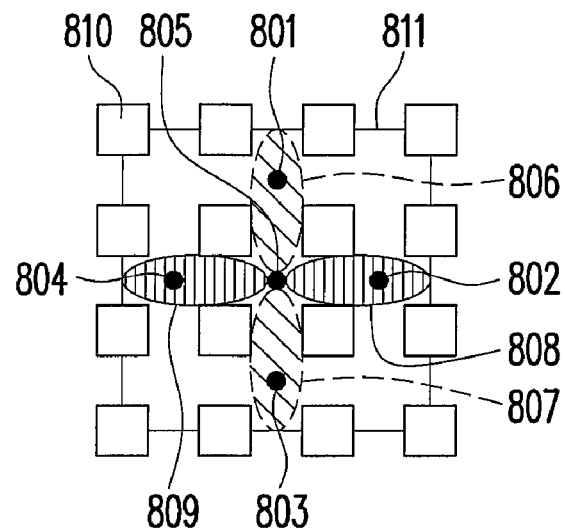
FIG. 8 illustrates the setup of a base station and a plurality of relay stations with directional antennas or sector antennas according to an exemplary embodiment of the present invention.

FIG. 8 illustrates the layout of relay stations in a Manhattan-like environment according to an embodiment of the present invention. Referring to FIG. 8, a microcell covers 690*690 square meters, and the base station 805 is disposed at a crossroad and four relay stations 801, 802, 803, and 804 are disposed at intersections of the two crossed streets with other streets in four directions, which is, the relay stations 801~804 are disposed at the intersections of the line of sight (LOS) and the non line of sight (NLOS) of the base station 805.

The base station 805 uses four directional antennas or a four-sector antenna for transmitting data to users in the streets in four directions and the relay stations 801~804, and the relay stations 801~804 use two directional antennas or two-sector antennas for data transmission with users within the NLOS of the base station 805. In other words, the base station 805 and four relay stations 801~804 serve all users within the coverage area 811 of a cell. Wherein users within the LOS of the base station can have single-hop links to the base station, while users outside of the LOS of the base station can establish multi-hop links to the base station through the relay stations.

Figure 1:
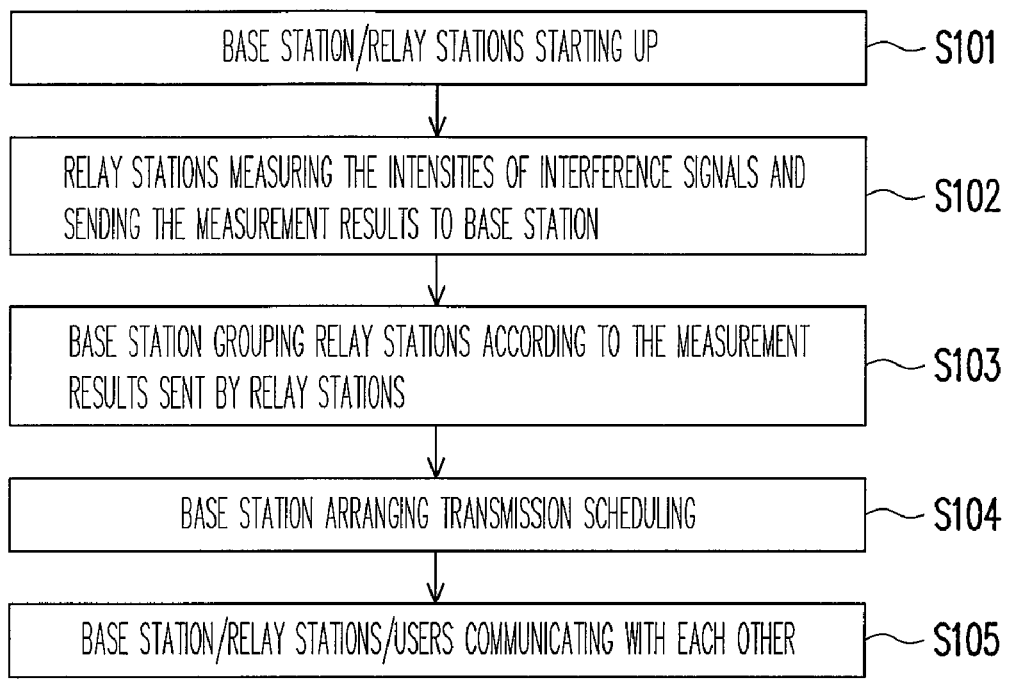
FIG. 1 is a flowchart of an actual implementation of the present invention.
Figure 2:
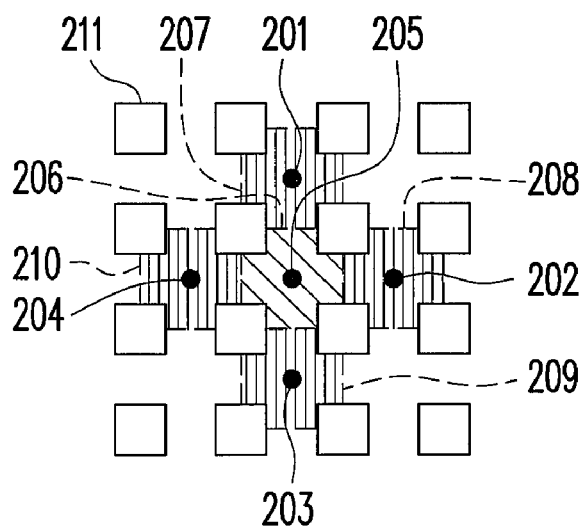
FIG. 2 illustrates the first setup of a base station and a plurality of relay stations of a single cell in a Manhattan-like environment according to a conventional technique.
Figure 3:
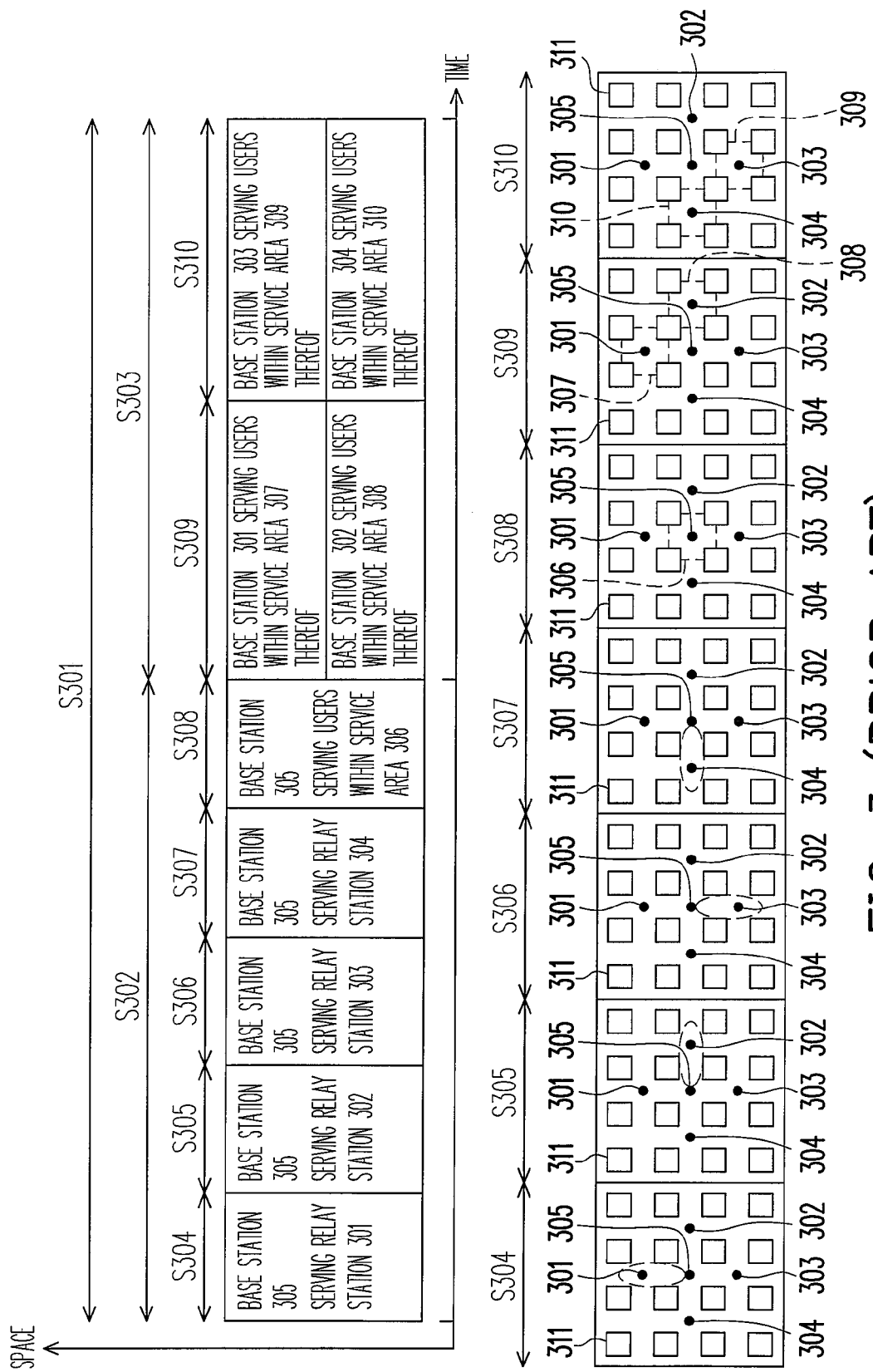
FIG. 3 illustrates the transmission frame structure within a single cell of the first setup in a Manhattan-like environment according to a conventional technique.
Figure 4:
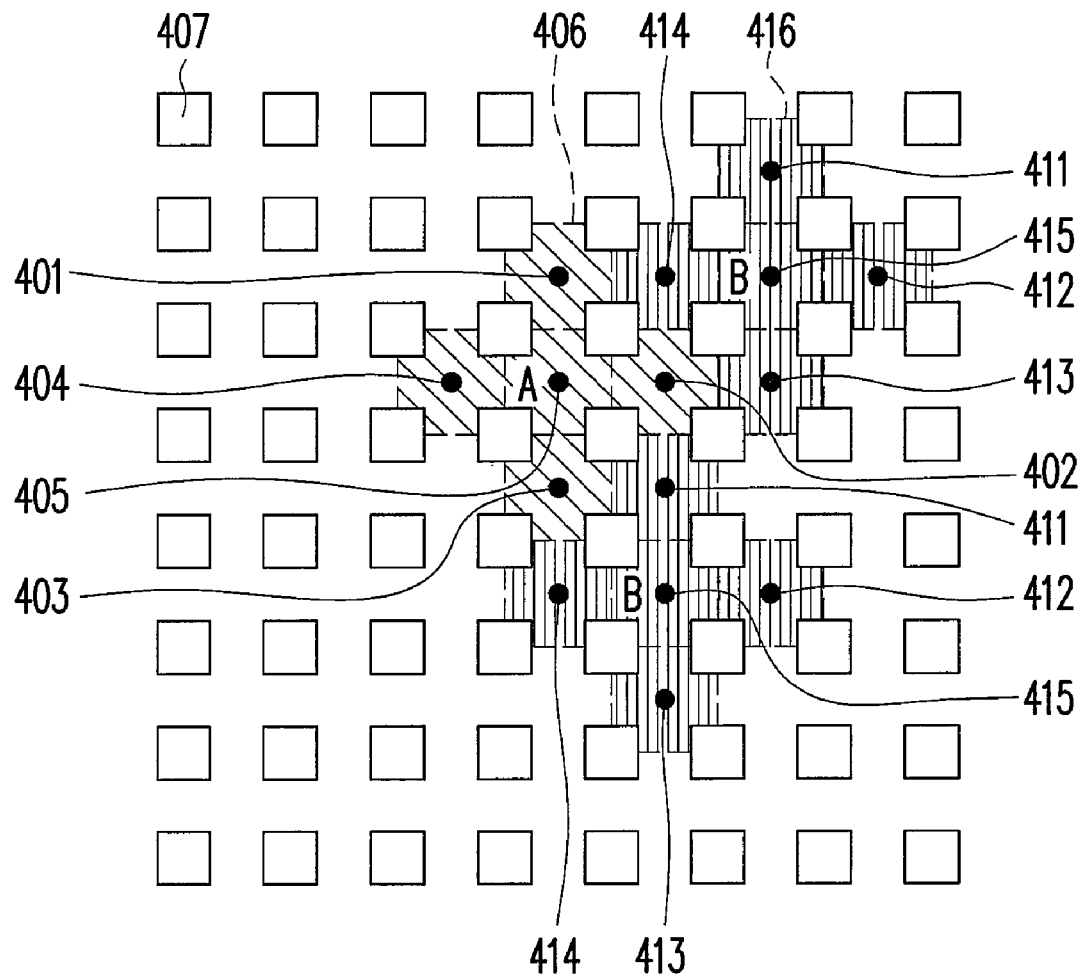
FIG. 4 illustrates the setup of base stations and relay stations of multiple cells of the first setup in a Manhattan-like environment according to a conventional technique.
Figure 5:
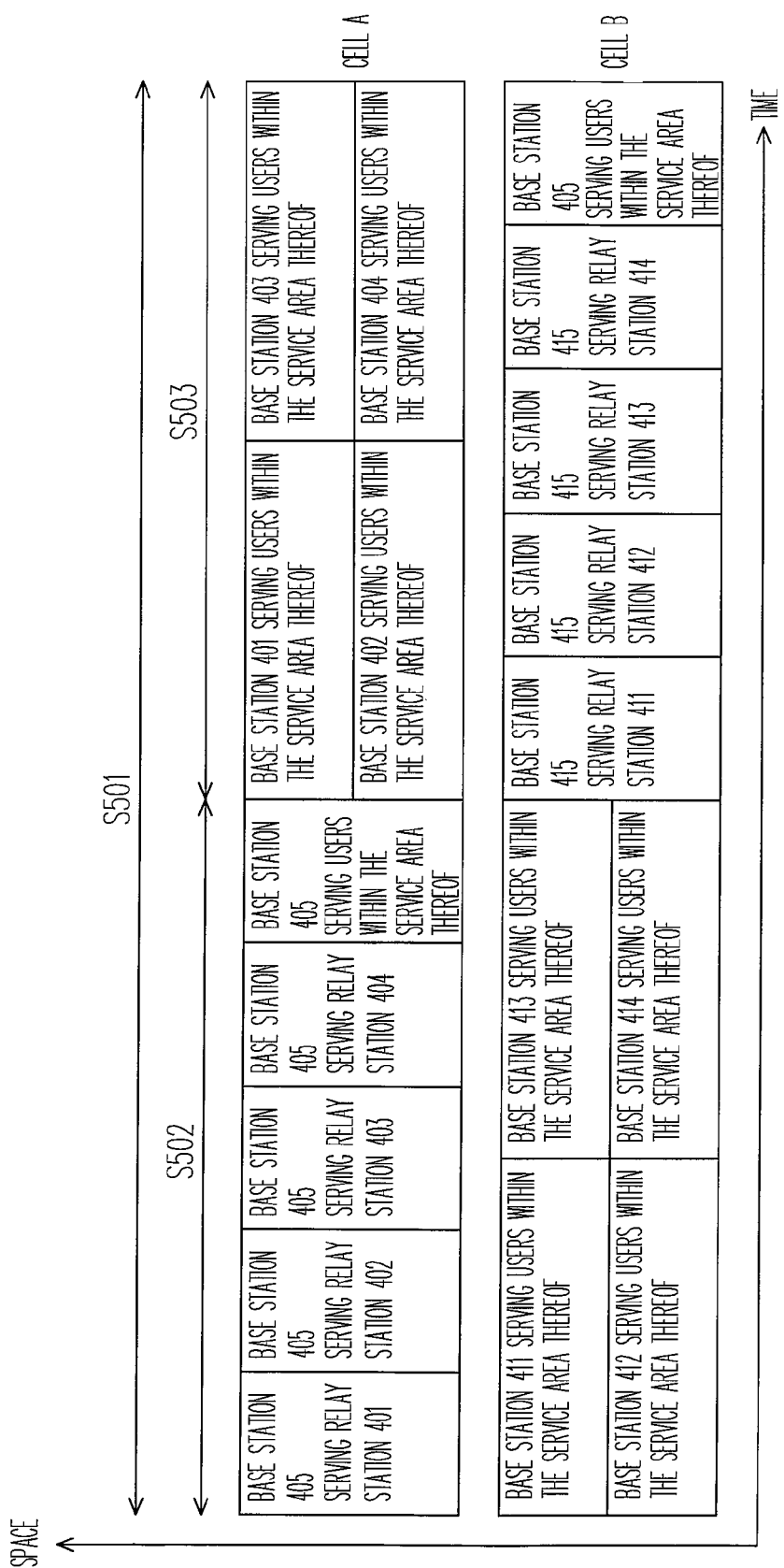
FIG. 5 illustrates the transmission frame structure between multiple cells of the first setup in a Manhattan-like environment according to a conventional technique.
Figure 6:
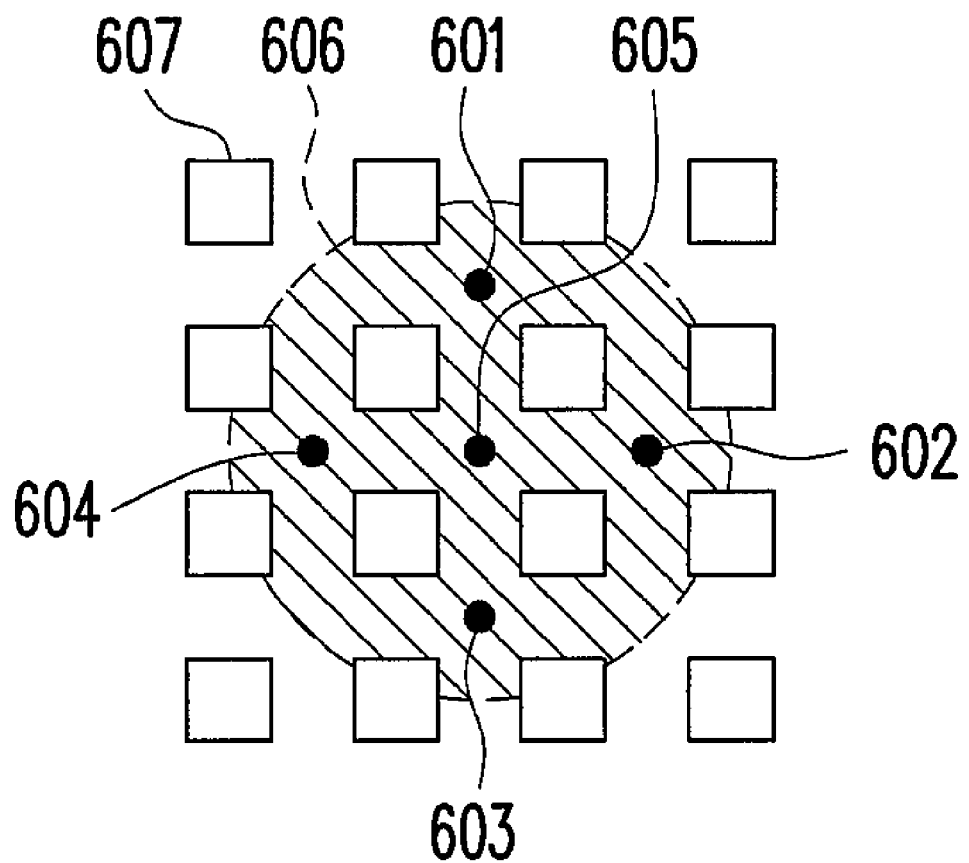
FIG. 6 illustrates the second setup of a base station and a plurality of relay stations with omni-directional antennas in a Manhattan-like environment according to a conventional technique.
Figure 7:
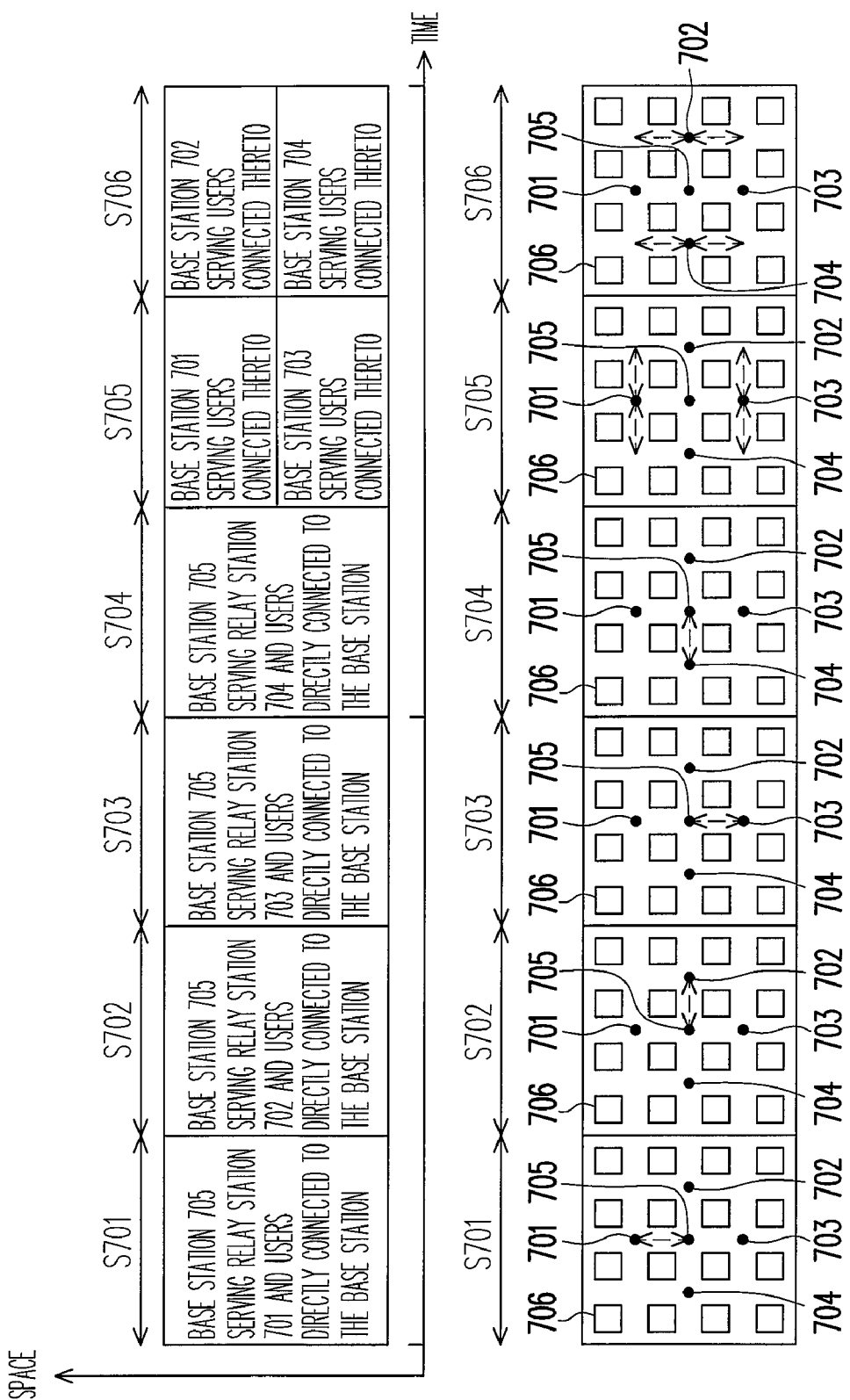
FIG. 7 illustrates the transmission frame structure within a single cell of the second setup with all serving stations equipped with omni-directional antennas in a Manhattan-like environment.

FIG. 1 illustrates the detailed implementation flow of the present invention. First, after the base station 805 and the relay stations 801~804 are started up in step S101, the relay stations 801~804 respectively measure the intensities of interference level from other relay stations and the base stations in step S102, wherein the potential interference level may be measured by measuring the data signal or the reference signal transmitted by the relay stations and base stations respectively. In step S103, the relay stations 801~804 report the measurement results thereof back to the base station 805. Next, the base station 805 separates the relay stations 801~804 into groups according to the measurement results reported by the relay stations 801~804. The base station 805 separates those relay stations which may potentially go beyond a tolerable interference threshold into different groups. For example, relay station 801 and relay station 803 are put into group A, while relay station 802 and relay station 804 are put into group B. Or, if the transmission target of one of the relay stations 801~804 is another relay station and the target relay station cannot receive and send data at the same time, the two relay stations are put into different groups. The smaller the number of groups is the better.

In step S104, the base station 805 arranges transmission scheduling of the relay stations 801~804 after the relay stations 801~804 are grouped. Wherein the number of groups is considered as the number of phases in a service period for transmission scheduling. Finally, in step S105, the base station 805, the relay stations 801~804, and the users start to communicate with each other.

In the present embodiment, if the number of groups is N, then a service period of a complete transmission scheduling can be divided into N phases, and downlink transmission and uplink transmission are contained in each phase. The foregoing one service period may be the length of a frame and the frame is divided into N phases, while the foregoing one service period may also be the length of a plurality of frames and the frames are divided into N phases all together. The downlink and uplink transmissions during various phases in a frame are arranged according to the definition of the frame, for example, the downlink and uplink transmissions during various phases may be arranged alternatively, or the downlink transmission of various phases are arranged first and then the uplink transmissions thereof are arranged. While the arrangement of downlink and uplink transmission is not limited by the present invention. In the present embodiment, the relay stations 801~804 are separated into 2 groups, accordingly, a service period is divided into 2 phases.

Figure 9:
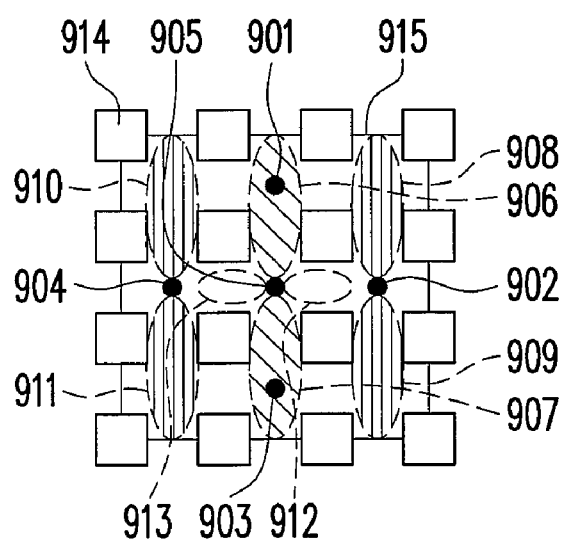
FIG. 9 illustrates the first phase of transmission scheduling for uplink transmission and downlink transmission within a single cell according to an exemplary embodiment of the present invention.

During the first phase, as shown in FIG. 9, the base station 905 serves the relay stations 901 and 903 in the first group (referred to as group A thereinafter) and users within the LOS 906~907 of the base station 905 in the direction of group A. The operations of the base station serving the group A include downlink transmission and/or uplink transmission.

The downlink transmission refers to that the base station 905 transmits data to the relay stations 901 and 903 in group A and to users within the LOS 906~907 of the base station 905 in the direction of group A. During the same phase, the relay station 902 in the second group (referred to as group B thereinafter) relays the data received from the base station 905 during the previous phase to users within the NLOS of the base station and within the LOS 908~909 of group B, and the relay station 904 in group B relays the data received from the base station 905 during the previous phase to users within the NLOS of the base station and within the LOS 910~911 of group B. Moreover, according to the actual requirement, those having ordinary knowledge in the art would also be able to make the base station 905 to serve users within the service areas 912~913 around the base station 905 and in the direction of group B with appropriate power control by lower transmission power during the first phase. Wherein, the lower transmission power allows the interference generated by the base station to the relay stations to be lower than a tolerable threshold.

The uplink transmission refers to the relay stations 901 and 903 in group A and users within the LOS 906~907 of the base station 905 in the direction of group A transmit data to the base station 905. During the same phase, the relay station 902 in group B receives the uplink data from users within the areas 908 and 909, and the relay station 904 in group B receives the uplink data from users within the areas 910 and 911. Moreover, according to the actual requirement, those having ordinary knowledge in the art would be able to make users within the service areas 912 and 913 around the base station 905 and in the direction of group B to transmit uplink data to the base station 905 during the first phase.

Figure 10:
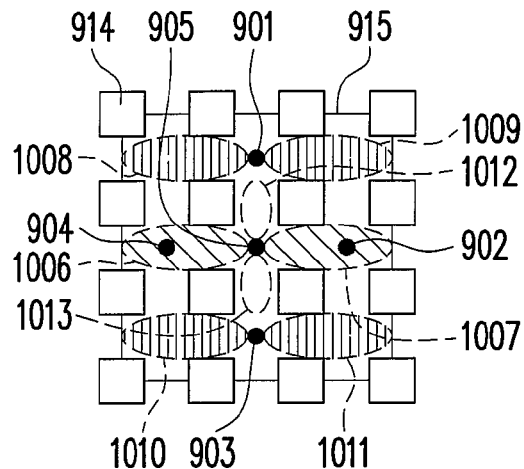
FIG. 10 illustrates the second phase transmission scheduling for uplink transmission and downlink transmission within a single cell according to an exemplary embodiment of the present invention.

During the second phase, as shown in FIG. 10, the base station 905 serves the group B and users within the LOS 1006 and 1007 of the base station 905 in the direction of group B. The operation of the base station 905 serving the group B includes downlink transmission and/or uplink transmission.

The downlink transmission during the second phase refers to the base station 905 transmitting data to the relay stations 902 and 904 in group B and users within the LOS 1006 and 1007 of the base station 905 in the direction of group B. During the same phase, the relay stations 901 and 903 in group A respectively relay the data received from the base station 905 during the previous phase to users within the NLOS of the base station and within the LOS 1008~1009 and 1010~1011 of group A. Moreover, according to the actual requirement, those having ordinary knowledge in the art would be able to make the base station 905 to serve users in the service areas 1012 and 1013 around the base station 905 and in the direction of group A with appropriate power control by lower transmission power during the second phase.

The uplink transmission during the second phase refers to the relay stations 902 and 904 in group B and users within LOS 1006 and 1007 of the base station 905 in the direction of group B transmit data to the base station 905. During the same phase, the relay station 901 in group A receives the uplink data from users in areas 1008 and 1009, and the relay station 903 in group A receives the uplink data from users within areas 1010 and 1011. Moreover, according to the actual requirement, those having ordinary knowledge in the art would be able to make users within the areas 1012 and 1013 to transmit uplink data to the base station 905 during the second phase.

Figure 11:
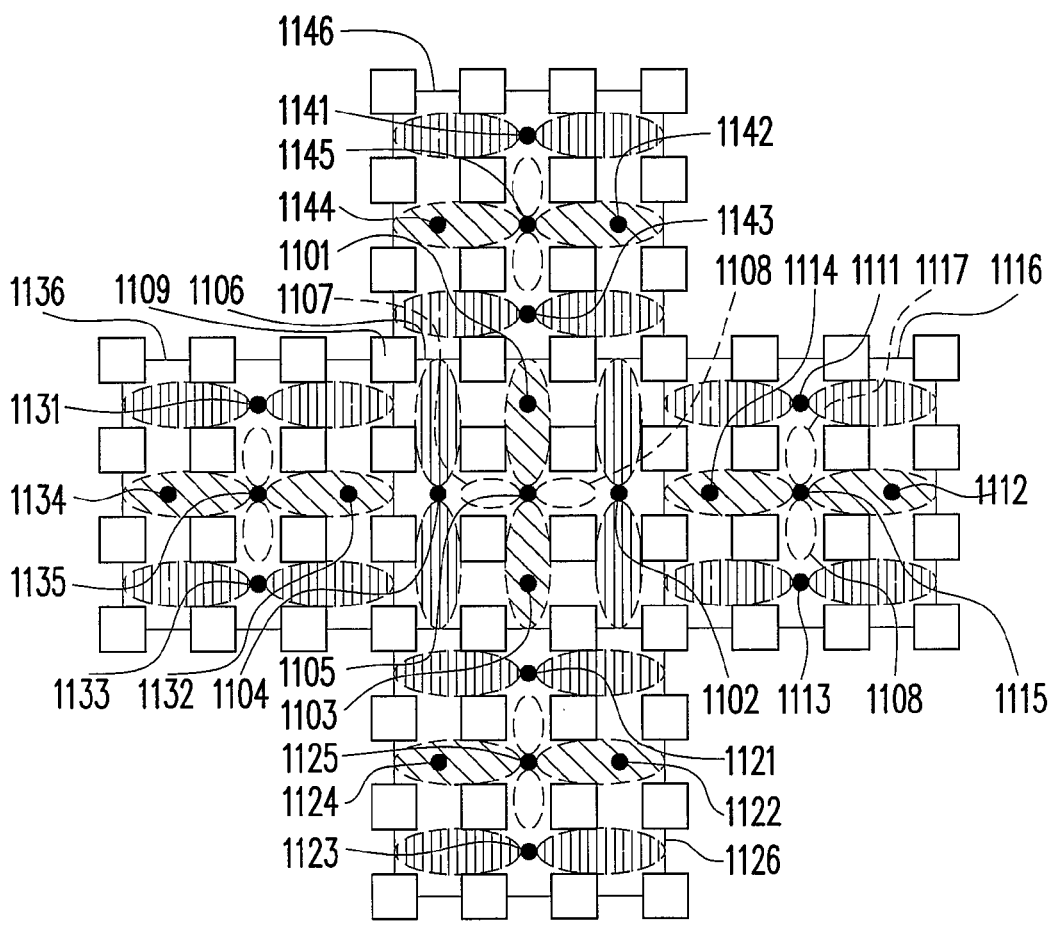
FIG. 11 illustrates the first phase transmission scheduling for uplink transmission and downlink transmission between adjacent cells according to an exemplary embodiment of the present invention.

In a multi-cell structure, the service orders of transmission scheduling of two adjacent cells are permuted with interferences between cells and the signal quality of users at cell boundary in consideration, as shown in FIG. 11. Wherein the cells adjacent to cell A (coverage area 1106) in four directions are cell B (coverage area 1116), cell C (coverage area 1126), cell D (coverage area 1136), and cell E (coverage area 1146). A base station 1115 and relay stations 1111~1114 are disposed in the coverage area 1116 of cell B; a base station 1125 and relay stations 1121~1124 are disposed in the coverage area 1126 of cell C; a base station 1135 and relay stations 1131~1134 are disposed in the coverage area 1136 of cell D; and a base station 1145 and relay stations 1141~1144 are disposed in the coverage area 1146 of cell E. In the present embodiment, the service orders of cells B~E are assumed to be the same. Accordingly, only cell B will be described below as an example.

Within the coverage area 1106 of cell A, when the base station 1105 serves the relay stations 1101 and 1103 in group A and users within the LOS of the base station 1105 in the direction of group A (i.e. the group A which performs single cell transmission scheduling), the adjacent base stations in four directions, for example, the base station 1115 in the coverage area 1116 of cell B, serves the relay stations 1112 and 1114 in group B and users in the LOS of the base station 1115 in the direction of group B (i.e. the group B which performs single cell transmission scheduling). Meanwhile, the relay stations 1102 and 1104 in group B within the coverage area 1106 of cell A and the relay stations 1111 and 1113 in group A within the coverage area 1116 of cell B perform data transmission (serving users). In the present embodiment, the base stations 1105 and 1115 respectively transmit data to users within areas 1107~1108 and 1117~1118 with lower transmission power.

Figure 12:
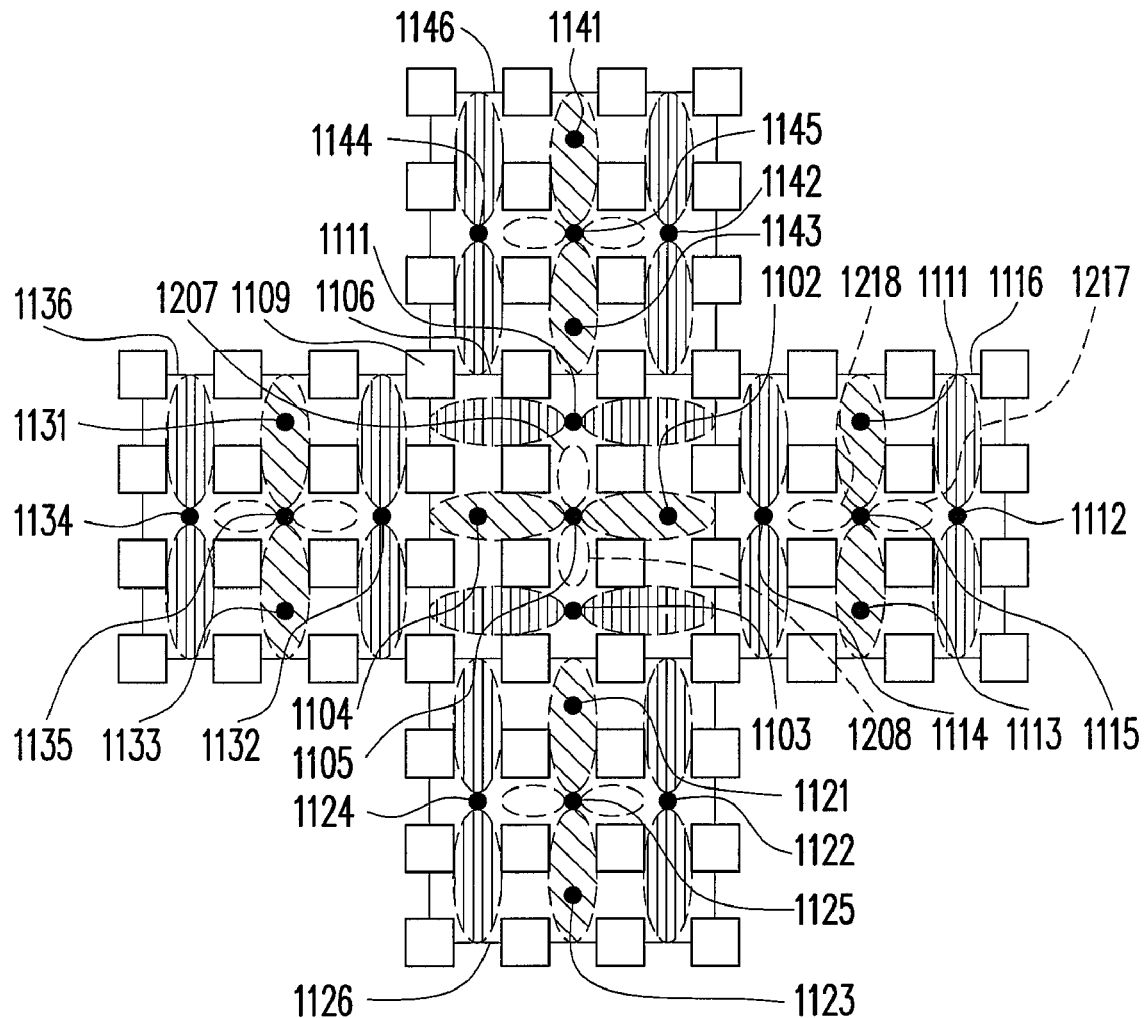
FIG. 12 illustrates the second phase transmission scheduling for uplink transmission and downlink transmission between adjacent cells according to an exemplary embodiment of the present invention.

FIG. 12 illustrates the operations during the next phase. Within the coverage area 1106 of cell A, when the base station 1105 serves the relay stations 1102 and 1104 in group B and users within the LOS of the base station 1105 in the direction of group B, the adjacent base stations in four directions, for example, the base station 1115 in the coverage area 1116 of cell B, serves the relay stations 1111 and 1113 in group A and users within the LOS of the base station 1115 in the direction of group A. Meanwhile, the relay stations 1101 and 1103 in group A within the coverage area 1106 of cell A and the relay stations 1112 and 1114 in group B within the coverage area 1116 of cell B perform data transmission (serving users). In the present embodiment, the base stations 1105 and 1115 respectively transmit data to users within areas 1207~1208 and 1217~1218 with lower transmission power.

Figure 13:
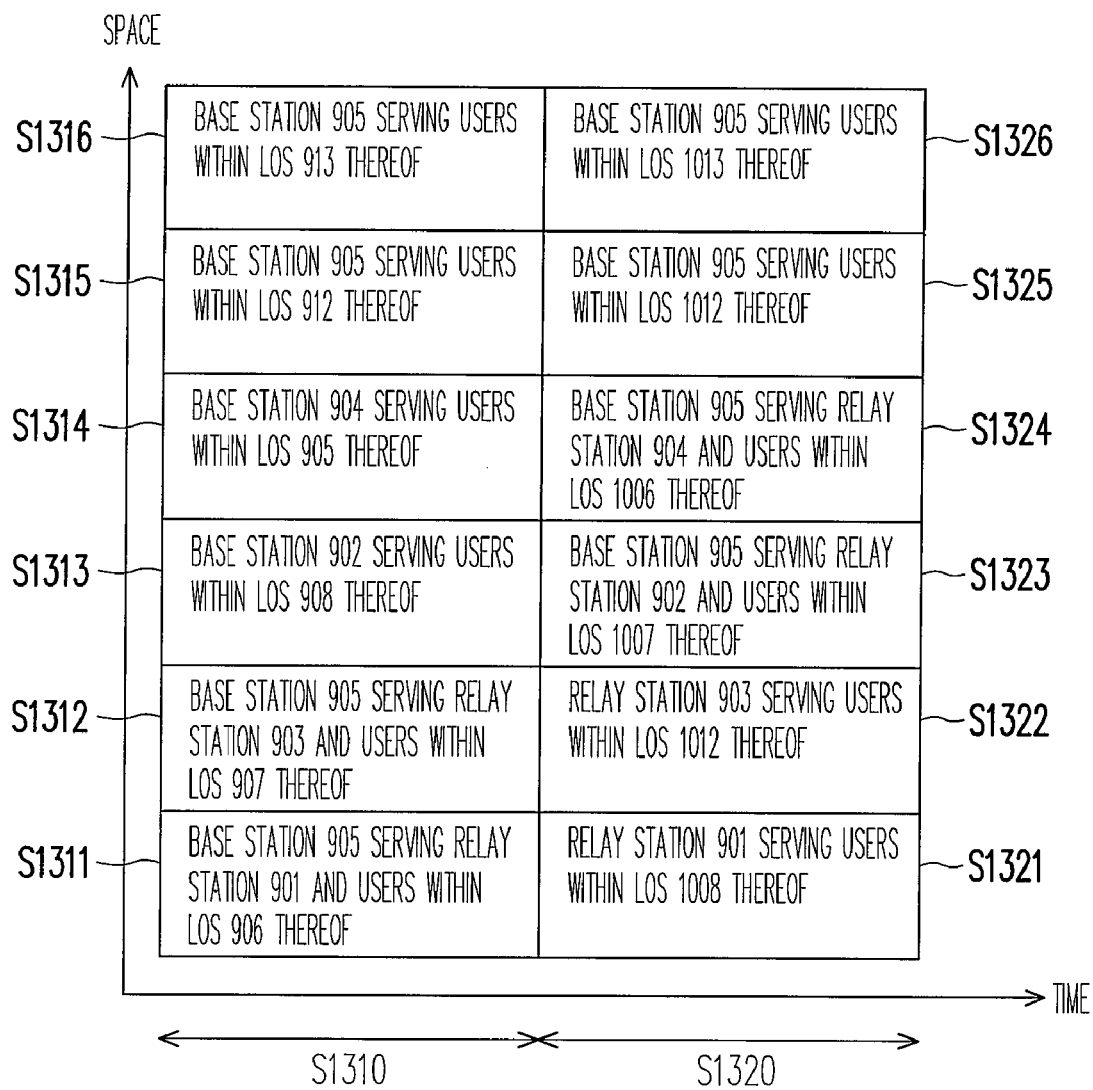
FIG. 13 illustrates the operations of single cell transmission scheduling during various phases according to an exemplary embodiment of the present invention.

FIG. 13 illustrates the operations of transmission scheduling during various phases of a single cell. Referring to FIGS. 9, 10, and 13, the operations S1311 and S1312 during the first phase S1310 of single cell transmission scheduling include the base station 905 serving the relay stations 901 and 903 in group A and users within area 906~907. During the same phase, the operations S1313 and S1314 of a single cell transmission scheduling S1310 include the relay stations 902 and 904 in group B respectively serving users within areas 908~909 and areas 910~911. Moreover, according to the actual requirement, those having ordinary knowledge in the art may also make the operations S1315 and S1316 during the first phase S1310 of a single cell transmission scheduling to be the base station serving users within areas 912~913.

The operations S1323 and S1324 during the second phase S1320 of a single cell transmission scheduling include the base station 905 serving the relay stations 902 and 904 in group B and users within areas 1006~1007. During the same phase, the operations S1321 and S1322 of the single cell transmission scheduling are that the relay stations 901 and 903 in group A respectively serve users within areas 1008~1009 and areas 1010~1011. Moreover, according to the actual requirement, those having ordinary knowledge in the art may also make the operations S1325 and S1326 during the second phase S1320 of a single cell transmission scheduling to be the base station serving users within areas 1012~1013.

In a multi-cell structure, the service orders of the transmission scheduling in the frame structures of two adjacent cells are permuted with interferences between cells and the signal quality of users at cell boundary in consideration.

Table 1 shows related comparisons between the present invention and the conventional technique. Wherein the "frequency reuse factor" shows the proportion of usable frequency of a single cell to the usable frequency of the system; since a base station is the only serving station connected to the backhaul network in a cell, the "effective frame" shows the number of frames a base station receives and sends during a service period; and the "capacity gain" is the gain obtained with the "frequency reuse factor" and the "effective frame" in consideration. The present invention is compared to the second setup in the WINNER's design with all serving stations equipped with omni-directional antennas of the same coverage areas. "Design 1 of the present invention" is the design wherein the base station does not serve users around the base station with lower transmission power, and "design 2 of the present invention" is the design wherein the base station serves users around the base station with appropriate power control by lower transmission power.

In the second setup in the WINNER's design with all serving stations equipped with omni-directional antennas, data has to be transmitted between adjacent cells on different frequencies to prevent interference between two adjacent cells, thus, the "frequency reuse factor" thereof is ½. In this design, 6 phases are needed to complete downlink transmission and/or uplink transmission, the actual number of frames transmitted by the base station is 4, thus, the "effective frame" is ⅔.

According to the present embodiment, in the first design of the present invention, data is transmitted on the same frequency between adjacent cells, thus, the "frequency reuse factor" thereof is 1. And during the two phases of a complete downlink transmission, the base station actually transmits 4 frames, thus, the "effective frame" thereof is 2, and uplink transmission is similar to downlink transmission. Besides, if it is assumed that the "capacity gain" of the second setup in the WINNER's design with all serving stations equipped with omni-directional antennas is 1, then the first design of the present invention excels 2 times in the usage of frequency spectrum and the "effective frame" of the first design of the present invention is 3 times of those of the second setup in the WINNER's design with all serving stations equipped with omni-directional antennas, thus, the "capacity gain" is 6.

In the second design of the present invention, since data is transmitted on the same frequency between adjacent cells, thus, the "frequency reuse factor" thereof is 1. During the 2 phases of a complete downlink transmission, the base station actually transmits 8 frames, thus, the "effective frame" is 4, and uplink transmission is similar to downlink transmission. Besides, if the "capacity gain" of the second setup in the WINNER's design with all serving stations equipped with omni-directional antennas is assumed to be 1, then the first design of the present invention excels 2 times in the usage of frequency spectrum and the "effective frames" of the first design of the present invention is 6 times of those of the second setup in the WINNER's design with all serving stations equipped with omni-directional antennas, thus, the "capacity gain" is 12.

TABLE 1

Comparisons between the present invention and conventional technique

| | Frequency reuse factor | Effective frames | Capacity gain |
|---|---|---|---|
| The second setup in the WINNER's design with all serving stations equipped with omni-directional antennas | ½ | ⅔ | 1 |
| Design 1 of the present invention | 1 | 2 | 6 |
| Design 2 of the present invention | 1 | 4 | 12 |

In summary, according to the present invention, in a wireless multi-hop relay communication system, the service areas of the base station and relay stations are divided into a plurality of regions by using the shadowing effect of the surroundings. The intensities of interference level are measured by the relay stations and sent to the base station, and the base station separates the relay stations into different groups according to the intensities of potential interference level reported by the relay stations, so that the base station serves the groups sequentially in the time domain. With good isolations of interfering signal due to shadow effect, the same radio resources can be reused and scheduled for different relay stations to substantially improve the system capacity with insignificant interference increment. In a multi-cell structure, universal frequency reuse is achieved by permuting the group service orders of transmission scheduling of adjacent cells. Through the mechanism of grouping and permutation of transmission scheduling, interference inside a single cell and between adjacent cells is prevented and high spectrum efficiency is achieved through aggressive radio frequency reuse. Furthermore, in the transmission scheduling structure provided by the present invention, the base station can transmit data during various phases; thus, the effective cell/system capacity can be improved considerably.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scheduling method for a wireless multi-hop relay communication system, wherein the wireless communication system comprises at least one base station dominating a plurality of relay stations, the scheduling method comprising:
   separating the relay stations into N groups according to intensity of potential interference level between the relay stations, wherein N is an integer greater than 0;
   dividing a service period into N phases by the base station, wherein N is a group number of the relay stations;
   serving the relay stations in a $j^{th}$ group during an $i^{th}$ phase by the base station, wherein $1 \leq i$, $j \leq N$; and
   serving the users and the subordinated relay stations within service areas of the relay stations not in the $j^{th}$ group during the $i^{th}$ phase by the relay stations not in the $j^{th}$ group.

2. The scheduling method as claimed in claim 1, wherein the relay stations are deployed to have line of sight (LOS) condition to the base station.

3. The scheduling method as claimed in claim 1, wherein the relay stations are deployed within a service area of the base station.

4. The scheduling method as claimed in claim 1, wherein the relay stations serve users have no LOS condition to the base station.

5. The scheduling method as claimed in claim 1, wherein the relay stations serve users having better link quality to the relay station but having worse link quality to the base station.

6. The scheduling method as claimed in claim 1, wherein the step of separating the relay stations into N groups comprises:
   measuring intensity of potential interference level from other relay stations and base stations by each of the relay stations, wherein the potential interference level is measured by measuring the data signal transmitted by the relay stations and base stations;
   reporting the measurement results to the base station by each of the relay stations; and
   separating the relay stations into N groups by the base station according to the measurement results reported by the relay stations.

7. The scheduling method as claimed in claim 1, wherein the step of separating the relay stations into N groups comprises:
   measuring intensity of potential interference level from other relay stations and base stations using each of the relay stations, wherein the potential interference level may be measured by measuring the reference signal transmitted by the relay stations and base stations respectively;
   reporting the measurement results to the base station by each of the relay stations; and
   separating the relay stations into N groups by the base station according to the measurement results reported by the relay stations.

8. The scheduling method as claimed in claim 7, wherein the step of separating the relay stations into N groups comprises:
   determining a scheduling order of the groups by the base station.

9. The scheduling method as claimed in claim 7, wherein two of the relay stations which may potentially go beyond a tolerable interference threshold are separated into different groups.

10. The scheduling method as claimed in claim 7, wherein if the transmission target of one relay station is another relay station and the target relay station cannot receive and send data simultaneously, the two relay stations are separated into different groups.

11. The scheduling method as claimed in claim 1, wherein the base station divides a service period into N phases, wherein N is a group number of the relay stations; wherein the service period is a length of a frame and the frame is divided into N phases.

12. The scheduling method as claimed in claim 1, wherein the base station divides a service period into N phases, wherein N is a group number of the relay stations; wherein a service period is a length of a plurality of frames and the frames are divided into N phases all together.

13. The scheduling method as claimed in claim 1, further comprising:
the base station serving users in a direction of relay stations in a $j^{th}$ group during an $i^{th}$ phase.

14. The scheduling method as claimed in claim 13, wherein the step of serving users in the direction of the relay stations in the $j^{th}$ group during the $i^{th}$ phase comprises:
performing downlink transmission to users in the direction of the relay stations in a $j^{th}$ group by the base station during an $i^{th}$ phase; and
performing uplink transmission to the base station by users in the direction of the relay stations in the $j^{th}$ group during the $i^{th}$ phase.

15. The scheduling method as claimed in claim 1, further comprising:
serving users not in the direction of the relay stations in the $j^{th}$ group but having the LOS condition to the base station with appropriate power control by lower transmission power during the $i^{th}$ phase using the base station;
wherein the lower transmission power allows an interference generated by the base station to the relay stations to be lower than a tolerable threshold.

16. The scheduling method as claimed in claim 1, wherein the step of the base station serving the relay stations in the $j^{th}$ group during the $i^{th}$ phase comprises:
performing downlink transmission to the relay stations in the $j^{th}$ group by the base station during the $i^{th}$ phase; and
performing uplink transmission to the base station by the relay stations in the $j^{th}$ group during the $i^{th}$ phase.

17. The scheduling method as claimed in claim 1, wherein the step of the relay stations not in the $j^{th}$ group serving users having the LOS condition to those relay stations during the $i^{th}$ phase comprises:
performing downlink transmission to users within the service areas of the relay stations not in the $j^{th}$ group during the $i^{th}$ phase by the relay stations not in the $j^{th}$ group; and
performing uplink transmission to the relay stations not in the $j^{th}$ group by users within the service areas of the relay stations not in the $j^{th}$ group during the $i^{th}$ phase.

18. The scheduling method as claimed in claim 1, wherein the users comprise mobile communication apparatuses.

19. The scheduling method as claimed in claim 18, wherein the mobile communication apparatuses comprise mobile phones and radio terminal reception equipments.

20. The scheduling method as claimed in claim 18, wherein the mobile communication apparatuses comprise radio terminal reception equipments.

21. A scheduling method for a wireless multi-hop relay communication system, wherein the wireless communication system comprises a plurality of cells and each cell comprises a base station and at least one relay station, the scheduling method comprising:

separating the relay stations in each cell into N groups according to intensity of potential interference level between the relay stations;
dividing a service period into N phases by the base station in each cell, wherein N is a group number of the relay stations in a cell;
wherein in any two adjacent cells A and B, in the cell A, the base station serves the relay stations in the $j^{th}$ group during the $i^{th}$ phase, wherein $1 \leq i, j \leq N$;
in the cell B, the base station serves the relay stations in the $k^{th}$ group during the $i^{th}$ phase, wherein $1 \leq k \leq N$;
in the cell A, relay stations not in the $j^{th}$ group serve users within the service areas of the relay stations not in the $j^{th}$ group during the $i^{th}$ phase; and
in the cell B, relay stations not in the $k^{th}$ group serving users within the service areas of the relay stations not in the $k^{th}$ group during the $i^{th}$ phase;
wherein the interference between the relay stations of the $j^{th}$ group of the cell A and the relay stations of the $k^{th}$ group in the cell B is within a predetermined interference threshold.

22. The scheduling method as claimed in claim 21, wherein the relay stations in each cell are deployed to have LOS condition to the base station in the cell.

23. The scheduling method as claimed in claim 21, wherein the relay stations in each cell are deployed within the service area of the base station in the cell.

24. The scheduling method as claimed in claim 21, wherein the relay stations in each cell serve users in the cell and without LOS condition to the base station in the cell.

25. The scheduling method as claimed in claim 21, wherein the relay stations in each cell serve users having better link quality to the relay station but worse link quality to the base station in the cell.

26. The scheduling method as claimed in claim 21, wherein the step of separating the relay stations in each cell into N groups comprises:
the relay stations in the cell respectively measuring the intensity of potential interference level from other relay stations and base stations, wherein the interference level is measured by measuring the data signal transmitted by the relay stations and base stations;
each relay station in the cell reporting the measurement results to the base station in the cell; and
separating the relay stations into N groups by the base station in the cell according to the measurement results reported by the relay stations.

27. The scheduling method as claimed in claim 21, wherein the step of separating the relay stations in each cell into N groups comprises:
measuring the intensity of potential interference level from other relay stations and base stations by each relay station in the cell, wherein the potential interference level may be measured by measuring the reference signals respectively transmitted by the relay stations and base station;
reporting the measurement results to the base station by each relay station in the same cell; and
separating the relay stations into N groups by the base station in the cell according to the measurement results reported by the relay stations.

28. The scheduling method as claimed in claim 27, wherein the step of separating the relay stations in each cell into N groups comprises:
determining the scheduling order of the relay station groups in the cell by the base station in the same cell.

29. The scheduling method as claimed in claim 27, wherein two of the relay stations in each cell which go beyond a predetermined interference threshold are separated into different groups.

30. The scheduling method as claimed in claim 27, wherein if the transmission target of one relay station in each cell is another relay station and the target relay station cannot receive and send data simultaneously, the two relay stations are separated into different groups.

31. The scheduling method as claimed in claim 21, wherein the base station in each cell divides a service period into N phases, wherein N is the group number of the relay stations in the cell; wherein the service period is a length of a frame and the frame is divided into N phases.

32. The scheduling method as claimed in claim 21, wherein the base station in each cell divides a service period into N phases, wherein N is the group number of the relay stations in the cell; wherein the service period is a length of a plurality of frames and the frames are divided into N phases all together.

33. The scheduling method as claimed in claim 21 further comprising:
in any of two adjacent cells A and B, the base station in the cell A serving users is in a direction of relay stations in the $j^{th}$ group during the $i^{th}$ phase; and
the base station in the cell B serving users is in a direction of relay stations in the $k^{th}$ group during the $i^{th}$ phase.

34. The scheduling method as claimed in claim 33 further comprising:
the base station in the cell A performing downlink transmission to users in a direction of the relay stations in the $j^{th}$ group during the $i^{th}$ phase;
the users in the cell A in the direction of the relay stations in the $j^{th}$ group performing uplink transmission to the base station during the $i^{th}$ phase;
the base station in the cell B performing downlink transmission to users in the direction of the relay stations in the $k^{th}$ group during the $i^{th}$ phase; and
the users in the cell B in the direction of the relay stations in the $k^{th}$ group performing uplink transmission to the base station during the $i^{th}$ phase.

35. The scheduling method as claimed in claim 21 further comprising:
serving users not in the direction of the relay stations in the $j^{th}$ group of cell A or not in the direction of the relay stations in the $k^{th}$ group of cell B but having the LOS condition to the base station with appropriate power control by lower transmission power during the $i^{th}$ phase by the base station in each cell;
wherein the lower transmission power allows the interference of the base station to the relay stations to be within a predetermined threshold.

36. The scheduling method as claimed in claim 21 further comprising:
the base station in the cell A performing downlink transmission to the relay stations in the $j^{th}$ group during the $i^{th}$ phase;
the relay stations in the $j^{th}$ group in the cell A performing uplink transmission to the base station during the $i^{th}$ phase;
the base station in the cell B performing downlink transmission to the relay stations in the $k^{th}$ group during the $i^{th}$ phase; and
the relay stations in the cell B in the $k^{th}$ group performing uplink transmission to the base station during the $i^{th}$ phase.

37. The scheduling method as claimed in claim 21 further comprising:
relay stations in the cell A not in the $j^{th}$ group performing downlink transmission to users within the service areas of the relay stations not in the $j^{th}$ group during the $i^{th}$ phase;
users in the cell A within the service areas of the relay stations not in the $j^{th}$ group performing uplink transmission to the relay stations not in the $j^{th}$ group during the $i^{th}$ phase;
the relay stations in the cell B not in the $k^{th}$ group performing downlink transmission to users within the service areas of the relay stations not in the $k^{th}$ group during the $i^{th}$ phase; and
users in the cell B within the service areas of the relay stations not in the $k^{th}$ group performing uplink transmission to the relay stations not in the $k^{th}$ group during the $i^{th}$ phase.

38. The scheduling method as claimed in claim 21, wherein the users comprise mobile communication apparatuses.

39. The scheduling method as claimed in claim 38, wherein the mobile communication apparatuses comprise mobile phones and other radio terminal reception equipments.

40. The scheduling method as claimed in claim 38, wherein the mobile communication apparatuses comprise other radio terminal reception equipments.

41. A system for reusing radio resources, the system comprising:
at least one relay station; and
at least one base station, separating the relay stations into N groups according to intensity of potential interference level between the relay stations, wherein N is an integer greater than 0;
wherein the base station divides a service period into N phases, wherein N is the group number of the relay stations; and
wherein the base station serves the relay stations in the $j^{th}$ group during the $i^{th}$ phase, wherein $1 \leq i$, $j \leq N$; and the relay stations not in the $j^{th}$ group serve users within the service areas of the relay stations not in the $j^{th}$ group during the $i^{th}$ phase.

42. The system as claimed in claim 41, wherein the relay stations are deployed to have the LOS condition to the base station.

43. The system as claimed in claim 41, wherein the relay stations are deployed within the service area of the base station.

44. The system as claimed in claim 41, wherein the relay stations serve users without the LOS condition to the base station.

45. The system as claimed in claim 41, wherein the relay stations serve users having better link quality to the relay station but worse link quality to the base station.

46. The system as claimed in claim 41, wherein each relay station measures the intensity of potential interference level from other relay stations and base stations and reports the measurement results to the base station, the interference level is measured by measuring the transmission data of the relay stations and base stations; and the base station separates the relay stations into N groups according to the measurement results reported by the relay stations.

47. The system as claimed in claim 41, wherein each relay station measures the intensity of potential interference level from other relay stations and reports the measurement results to the base station, the interference level is measured by measuring the reference signals respectively transmitted by the relay stations and base stations; and the base station divides the relay stations into N groups according to the measurement results reported by the relay stations.

48. The system as claimed in claim 47, wherein the base station determines the scheduling order of the relay station groups.

49. The system as claimed in claim 47, wherein two of the relay stations which go beyond a predetermined interference threshold are separated into different groups.

50. The system as claimed in claim 47, wherein if the transmission target of one relay station is another relay station and the target relay station cannot receive and send data at the same time, the two relay stations are separated into different groups.

51. The system as claimed in claim 41, wherein the base station serves users in the direction of the relay stations in the $j^{th}$ group during the $i^{th}$ phase.

52. The system as claimed in claim 51, wherein the base station performs downlink transmission to users in the direction of the relay stations in the $j^{th}$ group during the $i^{th}$ phase, and the users in the direction of the relay stations in the $j^{th}$ group perform uplink transmission to the base station during the $i^{th}$ phase.

53. The system as claimed in claim 41, wherein the base station serves users not in the direction of the relay stations in the $j^{th}$ group but having the LOS condition to the base station with appropriate power control by lower transmission power during the $i^{th}$ phase, and the lower transmission power allows the interference of the base station to the relay stations to be within a predetermined threshold.

54. The system as claimed in claim 41, wherein the base station performs downlink transmission to the relay stations in the $j^{th}$ group during the $i^{th}$ phase, and the relay stations in the $j^{th}$ group perform uplink transmission to the base station during the $i^{th}$ phase.

55. The system as claimed in claim 41, wherein relay stations not in the $j^{th}$ group perform downlink transmission to users within the service areas of the relay stations not in the $j^{th}$ group during the $i^{th}$ phase; and users within the service areas of the relay stations not in the $j^{th}$ group perform uplink transmission to the relay stations not in the $j^{th}$ group during the $i^{th}$ phase.

56. The system as claimed in claim 41, wherein the users comprise mobile communication apparatuses.

57. The system as claimed in claim 56, wherein the mobile communication apparatuses comprise mobile phones and radio terminal reception equipments.

58. The system as claimed in claim 56, wherein the mobile communication apparatuses comprise radio terminal reception equipments.

\* \* \* \* \*